(12) United States Patent
Kodama

(10) Patent No.: US 9,059,618 B2
(45) Date of Patent: Jun. 16, 2015

(54) METHOD OF PRODUCING ROTATING MACHINE PROVIDED WITH SLEEVE MOLDED OF POROUS MATERIAL

(75) Inventor: Mitsuo Kodama, Shizuoka (JP)

(73) Assignee: SAMSUNG ELECTRO-MECHANICS JAPAN ADVANCED TECHNOLOGY, CO., LTD., Shizuoka (JP)

( * ) Notice: Subject to any disclaimer, the term of this patent is extended or adjusted under 35 U.S.C. 154(b) by 943 days.

(21) Appl. No.: 13/196,774

(22) Filed: Aug. 2, 2011

(65) Prior Publication Data

US 2012/0049678 A1 Mar. 1, 2012

(30) Foreign Application Priority Data

Aug. 30, 2010 (JP) ................. 2010-192496

(51) Int. Cl.
*H02K 15/00* (2006.01)
*H02K 3/52* (2006.01)
*G11B 19/20* (2006.01)
*H02K 29/03* (2006.01)

(52) U.S. Cl.
CPC ........... *H02K 3/522* (2013.01); *Y10T 29/49009* (2015.01); *G11B 19/2009* (2013.01); *H02K 29/03* (2013.01); *H02K 2201/03* (2013.01)

(58) Field of Classification Search
USPC ............ 29/596–598, 603.03, 603.07; 310/90, 310/233; 360/99.08, 99.04, 97.01
See application file for complete search history.

(56) References Cited

U.S. PATENT DOCUMENTS

| | | | | |
|---|---|---|---|---|
| 2,915,657 | A * | 12/1959 | Van Rijn | 310/66 |
| 6,914,358 | B2 * | 7/2005 | Tokunaga et al. | 310/90 |
| 7,411,762 | B2 * | 8/2008 | Tamaoka | 360/99.08 |
| 7,514,831 | B2 * | 4/2009 | Tamaoka | 310/90 |
| 7,647,690 | B2 * | 1/2010 | Hada | 29/596 |
| 7,908,739 | B2 * | 3/2011 | Kagata et al. | 29/603.03 |
| 2012/0049678 | A1 * | 3/2012 | Kodama | 310/90 |

FOREIGN PATENT DOCUMENTS

JP 2009-074572 4/2009

* cited by examiner

*Primary Examiner* — Minh Trinh
(74) *Attorney, Agent, or Firm* — Z IP Law PLLC

(57) ABSTRACT

In a rotating machine, a base is configured such that a housing space is formed by joining a cover to the base and has a bearing hole communicating ambient air and the housing space. A sleeve is fitted into the bearing hole and formed with a porous material. The circumferential lower end portion of the sleeve is exposed to ambient air from the bearing hole. At least part of the pores on the surface of the circumferential lower end portion in contact with ambient air are filled in.

8 Claims, 11 Drawing Sheets

60

METHOD OF PRODUCING ROTATING MACHINE PROVIDED WITH SLEEVE MOLDED OF POROUS MATERIAL

BACKGROUND OF THE INVENTION

1. Field of the Invention

The present invention relates to a rotating machine provided with a sleeve molded of a porous material and a method of producing the rotating machine.

2. Description of the Related Art

There is a demand for further miniaturization and higher density of rotating machines, such as a hard disk drive. In response to the demand, in a rotating machine in which data is recorded, for example, magnetically, data is read and written with a magnetic head tracing over a recording disk through a slight gap between the two while the recording disk is being rotated at high speed. In the rotating machine, the recording disk and magnetic head are housed in a sealed housing space.

Japanese Patent Application Publication No. 2009-74572 discloses a fluid dynamic bearing having both a base with a communication hole communicating with ambient air and a sleeve that is made of a sintered member and fixed to the communication hole of the base. Part of the sleeve of the fluid dynamic bearing is exposed to ambient air.

In response to the miniaturization and higher density, the housing space in the rotating machine is filled with clean air in order to suppress the floating amount of the magnetic head. When a sleeve made of a sintered member is exposed to ambient air, there is the possibility that the clean air may leak out via the pores in the sleeve, even if the communication hole of a base is filled in by the sleeve as in the technique disclosed in the aforementioned Japanese Patent Application Publication.

SUMMARY OF THE INVENTION

The present invention has been made in view of these situations, and a purpose of the invention is to provide a rotating machine in which it is suppressed that the air in a housing space may leak out from the surface of a sleeve in contact with ambient air, while the sleeve is molded of a porous material.

In order to solve the aforementioned problem, a rotating machine according to an embodiment of the present invention comprises both a base that is configured such that a housing space is formed by joining a cover to the base and that has a bearing hole communicating ambient air and the housing space and a sleeve that is fitted into the bearing hole and formed with a porous material. The sleeve has an externally-exposed portion exposed to ambient air from the bearing hole. At least part of the pores on the surface of the externally-exposed portion that is in contact with ambient air are filled in.

According to the embodiment, because the pores in the externally-exposed portion are filled in, it can be suppressed that the air in the housing space may leak out.

Another embodiment of the present invention is a method of producing a rotating machine including a sleeve, the outer circumference of which is fixed to a bearing hole of a base. The method comprises: molding the sleeve with a porous material; forming dynamic pressure grooves on the inner circumference of the sleeve; sintering the sleeve; filling in at least part of the pores on the surface of an externally-exposed portion of the sleeve in contact with ambient air, the externally-exposed portion being exposed to ambient air when the sleeve has been fixed to the bearing hole; and removing residual substances in the sleeve. According to the embodiment, a rotating machine in which the pores in an externally-exposed portion have been filled in can be produced.

The "rotating machine" may be a device for driving a recording disk and, for example, may be a brushless motor. Alternatively, it may be a device in which a recording disk is mounted to be rotationally driven and, for example, may be a hard disk drive.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1:
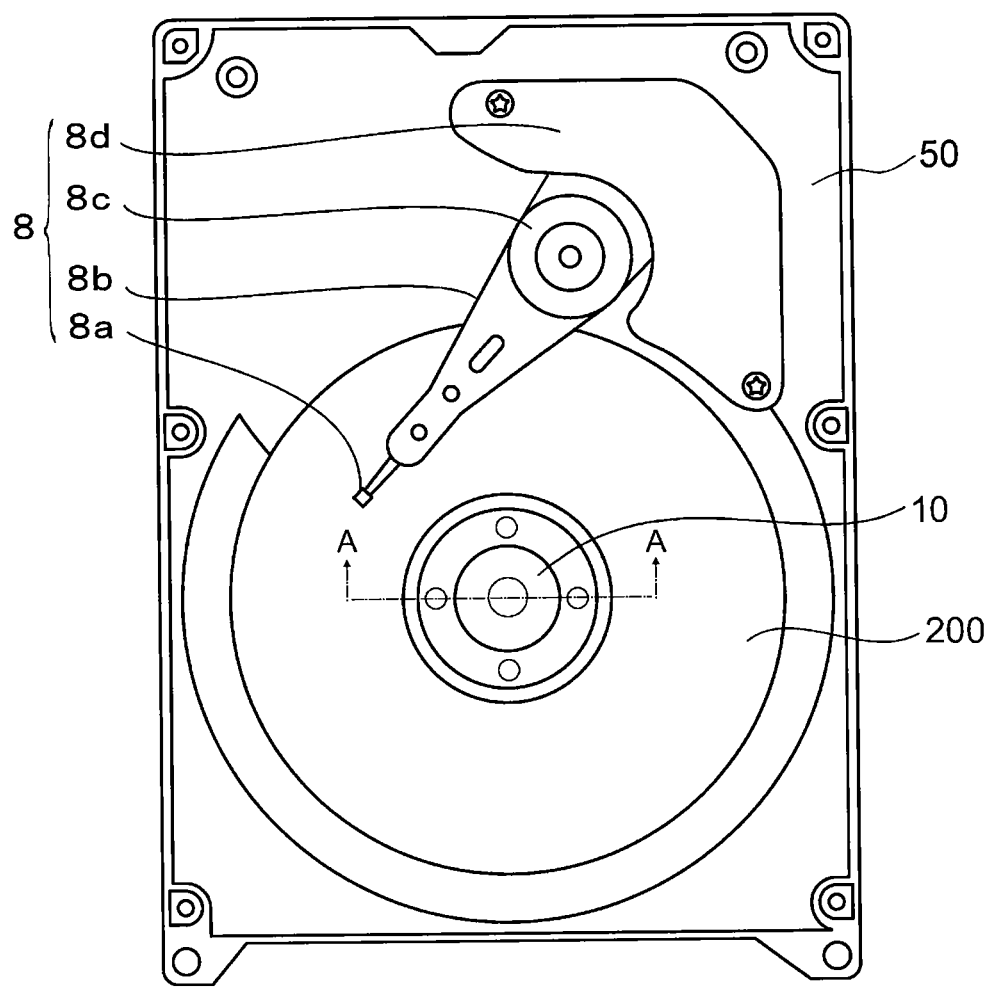
FIG. 1 is a top view illustrating a disk driver device according to an embodiment.

The invention will now be described by reference to the preferred embodiments. This does not intend to limit the scope of the present invention, but to exemplify the invention.

Hereinafter, the present invention will be described with reference to the drawings based on the preferred embodiments of the invention. The same or equivalent constituting elements and members illustrated in each drawing shall be denoted by the same reference numerals, and duplicative explanations will be omitted. Dimensions of members illustrated in each drawing are appropriately enlarged or reduced for easy understanding. Part of the members deemed not important for describing the embodiments are omitted from each drawing.

FIG. 1 is a top view illustrating a disk drive device 100 according to an embodiment. In order to illustrate the internal configuration of the disk drive device 100, FIG. 1 illustrates the state of atop cover being removed. The disk drive device according to the embodiment is one example of rotating machines and functions as, for example, a hard disk drive in which a recording disk is to be mounted.

The disk drive device 100 comprises a base 50, a hub 10, a recording disk 200, a data read/write unit 8, and the top cover. Hereinafter, description will be made, assuming that the side where the hub 10 is mounted with respect to the base 50 is the upper side.

The recording disk 200 is mounted on the hub 10 to be rotated with the rotation of the hub 10. The base 50 is formed with an aluminum alloy being molded by die-casting. The base 50 rotatably supports the hub 10 through a bearing, which will be described later. The data read/write unit 8 includes a recording/reproducing head 8a, a swing arm 8b, a pivot assembly 8c, and a voice coil motor 8d. The recording/reproducing head 8a is fixed to the tip of the swing arm 8b to record data on the recording disk 200 and to read data therefrom. The pivot assembly 8c supports the swing arm 8b in a swing-free manner around the head rotational axis relative to the base 50. The voice coil motor 8d makes the swing arm 8b swing around the head rotational axis such that the recording/reproducing head 8a is transferred to a desired position on the recording surface of the recording disk 200. The data read/write unit 8 is structured with a known technique for controlling the position of a head.

Figure 2:
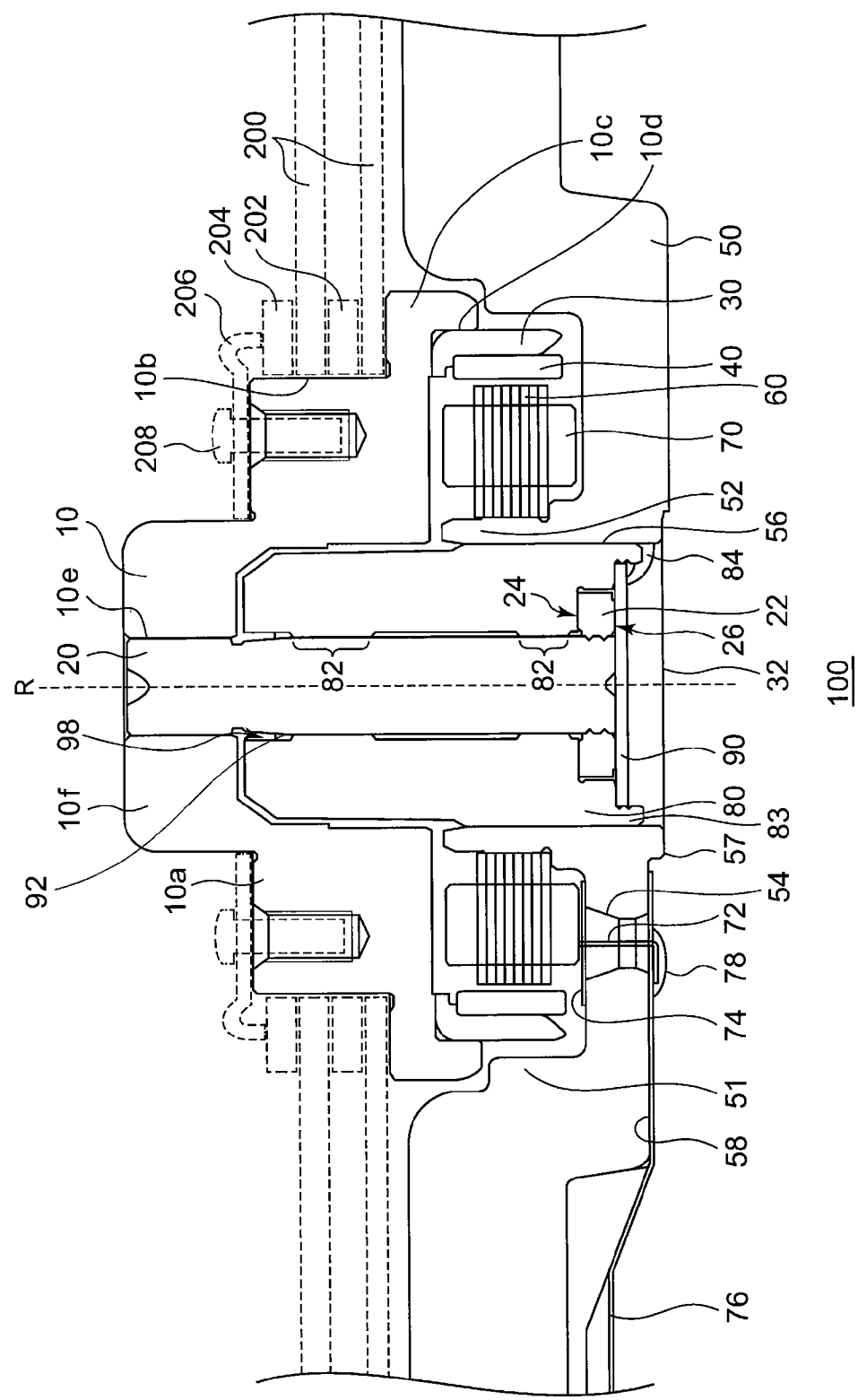
FIG. 2 is a sectional view, taken along the line A-A in FIG. 1.

FIG. 2 is a sectional view, taken along the line A-A in FIG. 1. The disk drive device 100 rotates a plurality of, for example, 3.5"-recording disks 200 that are mounted on the device 100. In each of the supposed recording disks 200, the diameter of the hole at the center is 25 mm, and the thickness is 1.27 mm. The disk drive device 100 comprises a hub 10, a shaft 20, a flange 22, a yoke 30, a sealing member 32, a magnet 40, a base 50, a stator core 60, a coil 70, a sleeve 80, a plate 90, and lubricant 92.

The hub 10 is formed into a convex shape centered on the motor rotational axis R. A shaft hole be is formed at the center of the hub 10, and an annular central portion 10f is formed around the shaft hole 10e. Two annular steps are formed on the upper surface of the hub 10, and the central portion 10f is located on the higher step. A concave portion 10a concaved one step from the central portion 10f is annularly formed. A plurality of screw holes for a clamper 206 are provided at positions at circumferentially equal intervals on the upper surface of the concave portion 10a.

An annular disk fitting portion 10b is formed as a step concaved from the outer circumferential end of the concave portion 10a, and an annular extending portion 10c, which extends radially outward from the outer circumferential lower end of the disk fitting portion 10b, is formed. The annular extending portion 10c includes a hanging portion that hangs toward the base 50, and the yoke 30 is fixed to the inner circumferential surface 10d of the hanging portion.

The central holes of the two recording disks 200 are fitted into the cylindrical disk fitting portion 10b, which is a portion of the hub 10 protruding upward. Of the two recording disks 200, the lower recording disk 200 is mounted on the annular extending portion 10c radially extending from the lower end of the disk fitting portion 10b.

An annular first spacer 202 is inserted between the two recording disks 200. The clamper 206 fixes the two recording disks 200 and the first spacer 202 by pressing them against the hub 10 through an annular second spacer 204. The clamper 206 is fixed with respect to the concave portion 10a of the hub 10 by the plurality of clamper screws 208 after the central hole of the clamper 206 has been extrapolated into the central portion 10f of the hub 10.

The yoke 30 is fixed by adhesion to the inner circumferential surface of the hub 10. The yoke 30 has a flange portion extending radially inward from the upper end thereof and is formed into an L-shape. The upper surface of the flange portion of the yoke 30 is also fixed by adhesion to the hub 10, thereby securing an adhesive surface.

The magnet 40 is fixed by adhesion to the inner circumferential surface of the yoke 30. The magnet 40 is formed of a rare earth metal, such as neodymium, iron, and boron, and radially faces the salient pole of the stator core 60. The inner circumferential surface of the magnet 40 is provided with a twelve-pole drive magnetization in the circumferential direction thereof. That is, the magnet 40 has twelve magnetic poles at positions at circumferentially equal intervals, the positions facing those of the salient poles of the stator core 60. The yoke 30 and magnet 40 are rotated with the hub 10.

One end of the shaft 20 is firmly attached to the shaft hole 10e of the hub 10 by a combination of press fitting and adhesion. The annular flange 22 is press-fitted into the other end of the shaft 20.

An annular protruding portion 52, which protrudes upward centered on the motor rotational axis R, is provided in the base 50. The outer circumferential surface of the annular protruding portion 52 is formed into a cylindrical shape centered on the motor rotational axis R. A bearing hole 56, which is a surface forming a hole space, is formed on the inner circumferential surface of the annular protruding portion 52 and the sleeve 80 is fixed by adhesion thereto. A through-hole is formed in the sleeve 80 and the shaft 20 is housed therein. The plate 90 is fixed to the inner circumferential surface of a circumferential lower end portion 83 of the sleeve 80. A conductive resin material 84 is applied near to the joint portion between a bearing unit for the plate 90 and sleeve 80, and the base 50. An opening 57 located at the lower end of the bearing hole 56 is sealed by pasting the sealing member 32 thereto. The base 50 has a width-increased portion 51 axially facing the hanging portion of the hub 10.

The lubricant 92 is injected between the shaft 20 and the flange 22 and between the sleeve 80 and the plate 90. The shaft 20, flange 22, lubricant 92, sleeve 80, and plate 90 function as a bearing unit for rotatably supporting the hub 10. That is, the base 50 rotatably supports the hub 10 through the bearing unit. The bearing unit is fixed to the bearing hole 56 of the base 50.

A pair of herringbone-shaped radial dynamic pressure grooves 82, which are vertically spaced apart from each other, are formed in the through-hole of the sleeve 80, i.e., on the inner circumferential surface of the sleeve 80. A herringbone-shaped first axial dynamic pressure groove 24 is formed on the upper surface of the flange 22, and a herringbone-shaped second axial dynamic pressure groove 26 is formed on the lower surface thereof. During the rotation of the disk drive device 100, the hub 10 and the shaft 20 are respectively supported in the radial direction and the axial direction by the dynamic pressure generated in the lubricant 92 by these dynamic pressure grooves.

A capillary seal portion 98, in which the gap between the inner circumferential surface of the sleeve 80 and the outer circumferential surface of the shaft 20 gradually expands toward the upper side, is formed near to the open end of the sleeve 80. The capillary seal portion 98 prevents leak of the lubricant 92 by capillarity.

The stator core 60 is fixed to the annular protruding portion 52 of the base 50 and has an annular portion and nine salient poles extending radially outward therefrom. The stator core 60 is formed by laminating multiple thin electromagnetic steel plates and by integrating them with caulking. Insulating coating is performed on the surface of the stator core 60 by electro-deposition coating or powder coating, etc. The stator core 60 is fixed by the inner circumferential surface of the annular portion being press-fitted or clearance-fitted into the outer circumference of the annular protruding portion 52.

A wire 72 forming the coil 70 is pulled out to the back surface of the base 50 through a pull-out hole 54 formed in the base 50 and soldered to a wiring 76 by solder 78. The wiring 76 is installed in a concave portion 58 concaved with respect to the opening 57. The wiring 76 is a flexible printed circuit board having flexibility. An insulation sheet 74 is pasted to an area of the base 50 facing the coil 70, thereby allowing the insulation between the coil 70 and the base 50 to be achieved. The three-phase coil 70 is formed by winding wires around the salient poles.

Operations of the disk drive device 100 configured as stated above will be described. In order to rotate the hub 10 in the disk drive device 100, a three-phase drive current with an approximately sine wave shape is supplied to the disk drive device 100. A magnetic flux is generated along each of the nine salient poles with the drive current flowing through the coil 70. Torque is provided to the magnet 40 by the magnetic flux, thereby allowing the hub 10 to be rotated.

Figure 3:
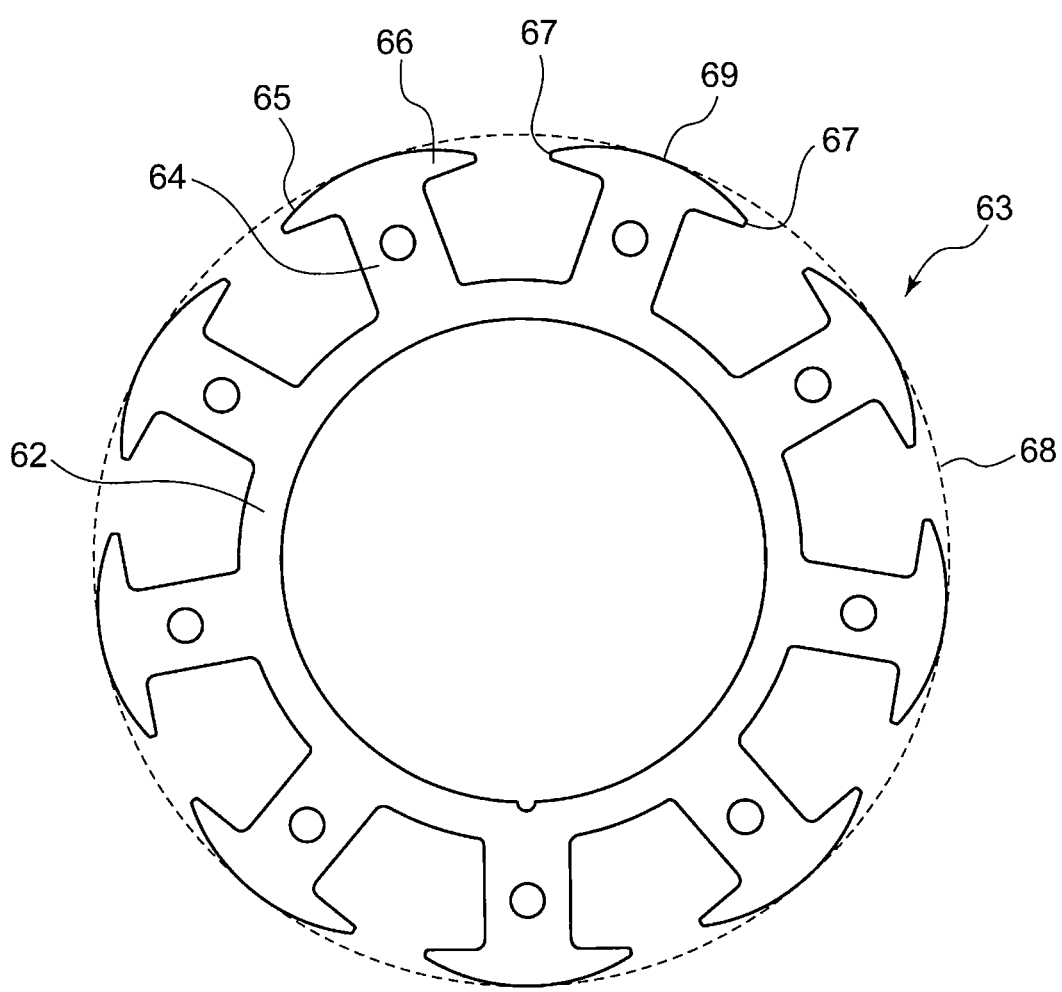
FIG. 3 is a view illustrating the top view of a stator core according to the embodiment.

FIG. 3 illustrates the top view of the stator core 60 according to the embodiment. The stator core 60 includes an annular portion 62 and a salient pole 63 radially extending therefrom. The salient pole 63 has rod-shaped bodies 64 around which wires are wound and tooth portions 66 each being provided radially outside the rod-shaped body 64 and extending radially. The outer circumferential surface 65 of the tooth portion 66 is formed into an arc shape.

In the disk drive device 100 according to the embodiment, it is preferable that torque ripple and cogging torque are made to be small in order to reduce vibration occurring during the drive of the disk drive device in accordance with the demand for miniaturization thereof. In the disk drive device 100, drive torque is generated by the interaction between the magnetic flux generated by the coil 70 and the magnetic pole of the magnet 40. Torque ripple is a pulsating component included in the drive torque and indicates a fluctuation range of the torque during rotation. Cogging torque is pulsating torque that is generated when the hub 10 and magnet 40 are operated in a non-powered state and is generated due to a factor at the magnetization of the salient pole of the stator core 60 and the magnet 40.

The stator core 60 according to the embodiment is formed such that the end portion 67 in the circumferential direction of the tooth portion 66 is located radially inside a circumscribed circle 68 passing through a tip 69 located at the radially outermost end of the tooth portion 66. The end portion 67 is a tip where the end portion in the circumferential direction of the tooth portion 66 is pointed. Thereby, vibration occurring during the drive can be reduced by reducing cogging torque and torque ripple. Specifically, this will be described by using the following experimental results.

Figure 4A:
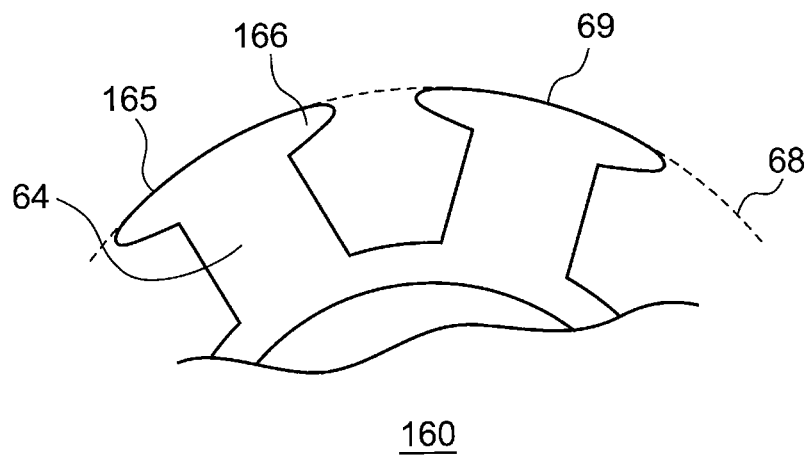
FIG. 4A is a view illustrating the salient pole of a stator core according to a conventional technique.
Figure 4B:
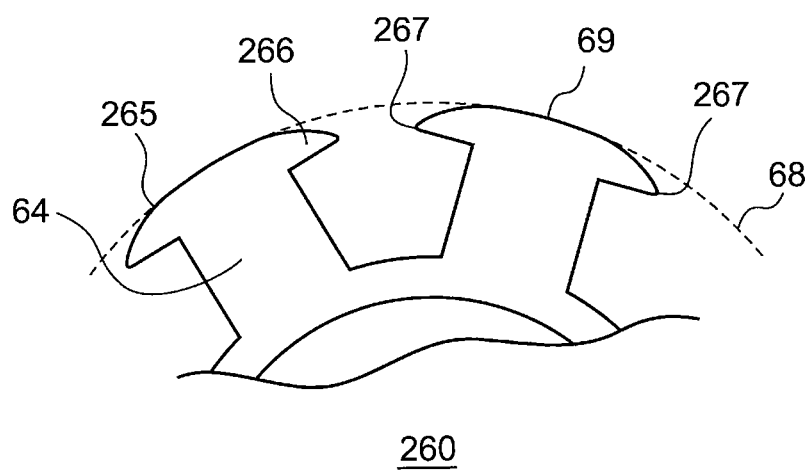
FIG. 4B is a view illustrating the stator core according to the embodiment.
Figure 4C:
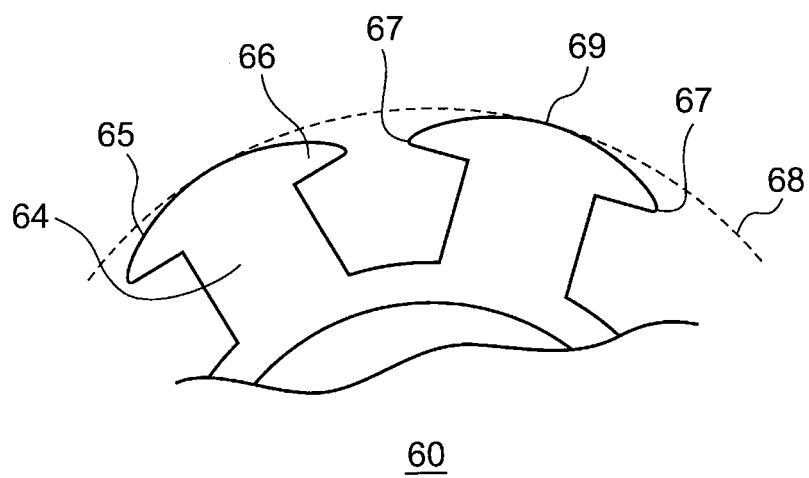
FIG. 4C is view illustrating a stator core according to another embodiment.

FIGS. 4A to 4C illustrate the shape of the salient pole of the stator core. FIG. 4A illustrates a stator core 160 according to a conventional technique, FIG. 4B illustrates a variation of a stator core 260 according to the embodiment, and FIG. 4C illustrates the stator core 60 according to the embodiment. Although the radius of the circumscribed circle 68 passing through the tip illustrated in each view is the same as each other and the size of the rod-shaped body is also the same as each other, the shape of the tooth portion is different from others.

A tooth portion 166 of the stator core 160 illustrated in FIG. 4A is formed such that the whole outer circumferential surface 165 has the same curvature radius as that of the circumscribed circle 68. Subsequently, a tooth portion 266 of the stator core 260 illustrated in FIG. 4B has a shape in which the end portion of the outer circumferential surface 165 of the tooth portion 166 in FIG. 4A has been shaved. Accordingly, the end portion 267 in the circumferential direction of the tooth portion 266 is located radially inside the circumscribed circle 68, although the central portion of the outer circumferential surface 265 has the same curvature radius as that of the circumscribed circle 68. Subsequently, the stator core 60 illustrated in FIG. 4C is the same as that illustrated in FIG. 3. The stator core 60 is the same as the stator core 260 in that the end portion 67 in the circumferential direction of the tooth portion 66 is located radially inside the circumscribed circle 68, but different in that the outer circumferential surface 65 of the tooth portion 66 of the stator core 60 has an arc shape. These stator cores 160, 260, and 60 were installed in disk drive devices to measure back electromotive forces and vibration amounts when the magnet 40 was rotated in a non-powered state.

Figure 5A:
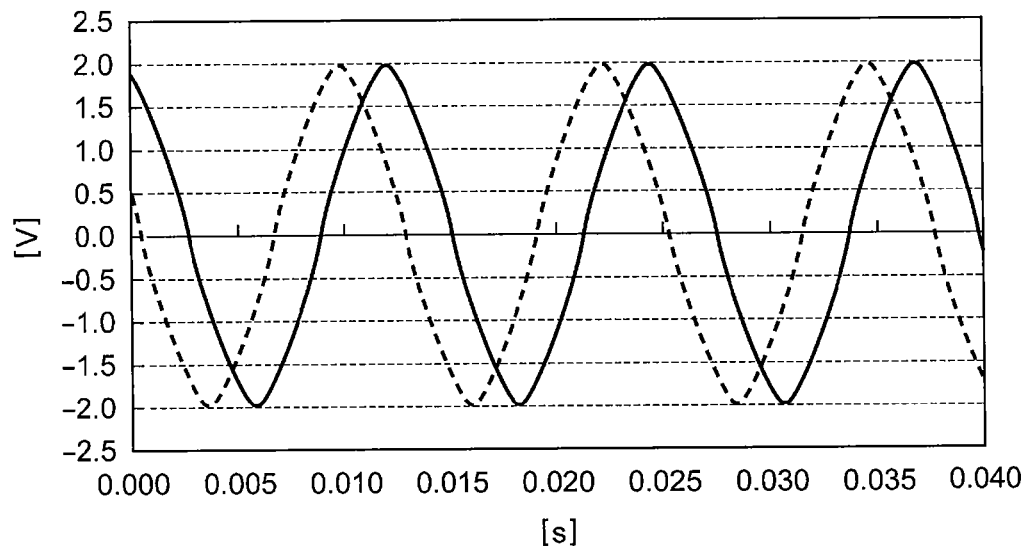
FIG. 5A is a graph illustrating a back electromotive force in accordance with the shape of the stator core illustrated in FIG. 4A.
Figure 5B:
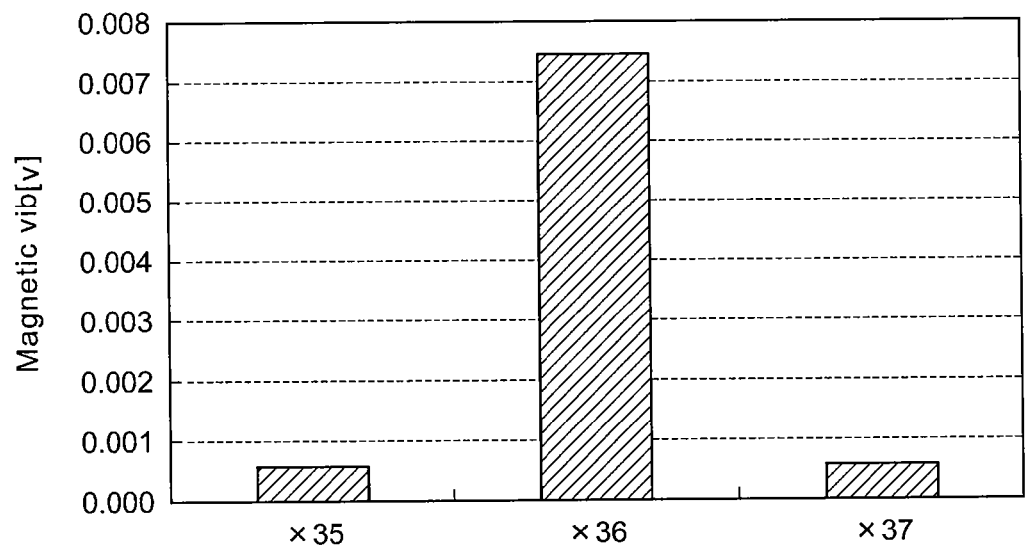
FIG. 5B is a graph illustrating a vibration amount in accordance with the shape of the stator core illustrated in FIG. 4A.
Figure 6A:
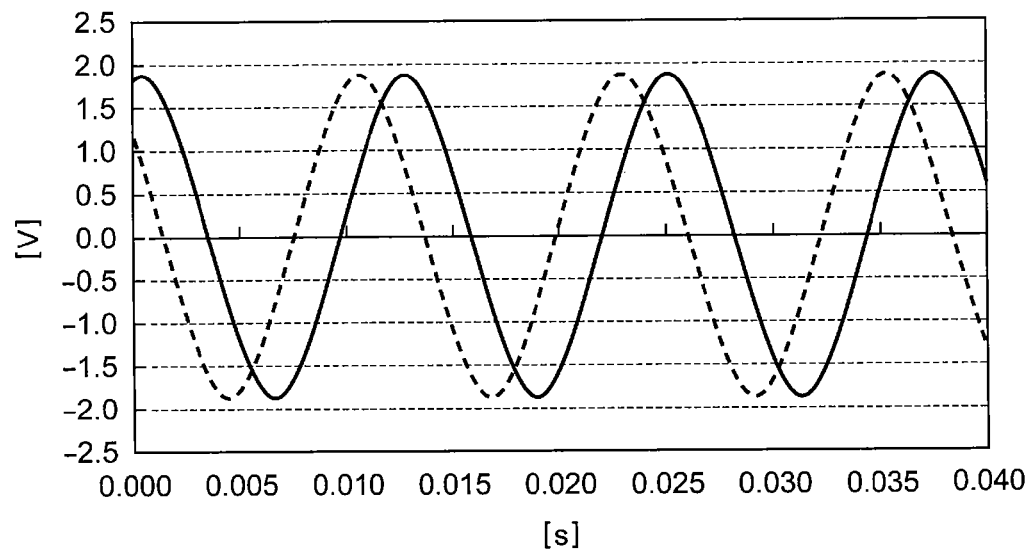
FIG. 6A is a graph illustrating a back electromotive force in accordance with the shape of the stator core illustrated in FIG. 4B.
Figure 6B:
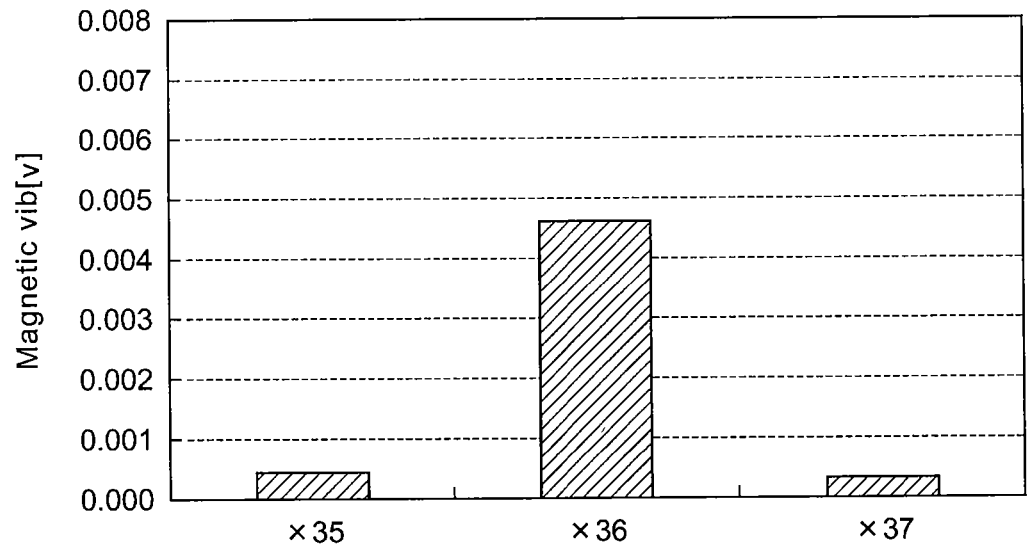
FIG. 6B is a graph illustrating a vibration amount in accordance with the shape of the stator core illustrated in FIG. 4B.
Figure 7A:
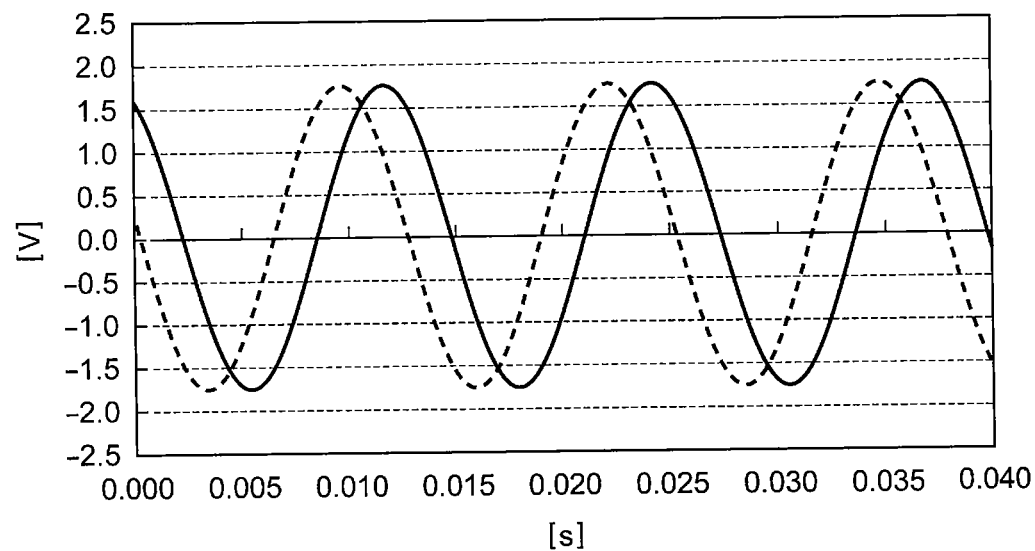
FIG. 7A is a graph illustrating a back electromotive force in accordance with the shape of the stator core illustrated in FIG. 4C.
Figure 7B:
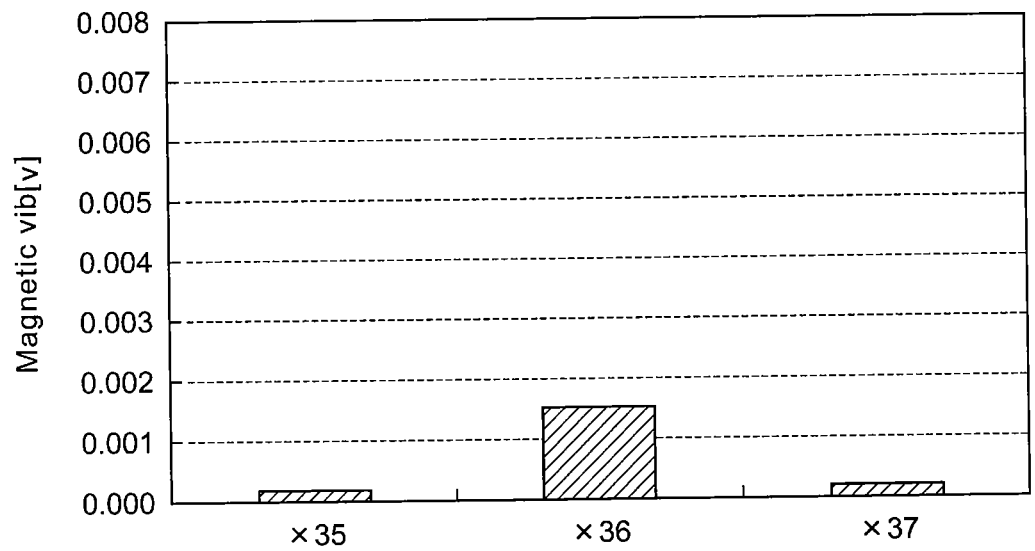
FIG. 7B is a graph illustrating a vibration amount in accordance with the shape of the stator core illustrated in FIG. 4C.

FIGS. 5A and 5B to 7A and 7B illustrate back electromotive forces and vibration amounts in accordance with the shapes of the stator core. FIGS. 5A and 5B illustrate experimental results of the stator core 160 illustrated in FIG. 4A, FIGS. 6A and 6B illustrate those of the stator core 260 illustrated in FIG. 4B, and FIGS. 7A and 7B illustrate those of the stator core 60 illustrated in FIG. 4C.

Each of FIGS. 5A, 6A, and 7A illustrates a back electromotive force generated in the coil 70 when the hub 10 is rotated in a non-powered state. The back electromotive force is illustrated as a voltage waveform. As the back electromotive force has a curve closer to a sine curve, cogging torque and torque ripple are reduced, and accordingly the hub 10 can be smoothly rotated during the drive, thereby allowing vibration during the drive to be reduced. The back electromotive force illustrated in FIG. 5A has a shape more deviated from a sine curve than the shapes of the back electromotive forces illustrated in FIGS. 6A and 7A. The cogging torque of the stator core 160 was 1.3 mN*m, and the torque ripple was 15%.

Subsequently, the back electromotive force in FIG. 6A is closer to a sine curve than that illustrated in FIG. 5A. The cogging torque of the stator core 260 was 0.75 mN*m, and the torque ripple was 14.5%. When the vibration amount illustrated in FIG. 6B is compared with that illustrated in FIG. 5B, a vibration amount occurring in the disk drive device 100 using the stator core 260 is more reduced. Thereby, the present inventor has acquired the knowledge that, by arranging the end portion 267 in the circumferential direction of the tooth portion 266 radially inside the circumscribed circle 68, vibration occurring in the disk drive device 100 can be reduced. The vibration amounts illustrated in FIGS. 5B, 6B, and 7B were measured as follows. An acceleration sensor is attached to an area located on the back surface of the base 50, above which the coil 70 is placed. An amplifier for amplifying an output of the acceleration sensor and a measuring instrument for calculating an output received from the amplifier, are connected to the acceleration sensor. Then, an output of the acceleration sensor is measured when a drive current is supplied to the coil 70 and the measured value is calculated as a vibration amount.

Subsequently, the back electromotive force illustrated in FIG. 7A has a shape closer to a sine curve than those of the back electromotive forces illustrated in FIGS. 5A and 6A. The cogging torque of the stator core 260 was 0.39 mN*m, and the torque ripple was 14.3%. When the vibration amount illustrated in FIG. 7B is compared with those illustrated in FIGS. 5B and 6B, a vibration amount occurring in the disk drive device 100 using the stator core 60 illustrated in FIG. 7B is more reduced. Thereby, the present inventor has acquired the knowledge that, by arranging the end portion 67 in the circumferential direction of the tooth portion 66 radially inside the circumscribed circle 68 and by forming the outer circumferential surface 65 of the tooth portion 66 into an arc shape, vibration occurring in the disk drive device 100 can be further reduced. Accordingly, cogging torque and torque ripple can be reduced by arranging the end portion 67 in the circumferential direction of the tooth portion 66 radially inside the circumscribed circle 68, thereby allowing vibration occurring during the drive to be reduced.

Referring back to FIG. 3, it is preferable to form the arc shape of the outer circumferential surface 65 of the tooth portion 66 such that the curvature radius of the arc shape is smaller than that of the circumscribed circle 68 passing through the tip 69, and to form the arc shape thereof such that the curvature radius thereof is approximately half that of the circumscribed circle 68. Thereby, vibration occurring in the disk drive device 100 can be much further reduced.

The magnet poles of the magnet 40 are provided such that the circumferential dimension thereof is approximately three times that of the space between the two tooth portions 66 circumferentially adjacent to each other. For example, the angle width of the magnetic pole of the magnet 40 having twelve magnet poles is set to be 30 degrees and that of the space between the tooth portions 66 of nine salient poles 63 is set to be 10 degrees. Because the distance between the magnet 40 and the tooth portion 66 is very small in comparison with that between the central axis of the stator core 60 and the tooth portion 66, the circumferential dimension of the magnet pole becomes approximately three times that of the space between the tooth portions 66. As a result of experiments, torque ripple was able to be reduced, and, accordingly, a decrease in the torque was able to be suppressed with such a configuration.

The end portion 67 in the circumferential direction of the stator core 60 may be located radially inside the outer diameter portion of the disk fitting portion 10b of the hub 10. Thereby, an influence by a magnetic field from the stator core 60 onto the recording disk 200 can be made small. Also, the tip 69 of the stator core 60 may be located radially inside the outer diameter portion of the disk fitting portion 10b of the hub 10.

It is assumed that the diameter of the circumscribed circle 68 passing through the tip 69 of the salient pole 63 is D1, the diameter of an inscribed circle passing through the inner circumference of the end portion 67 in the circumferential direction of the salient pole 63 is D2, the diameter of the outer circumference of the magnet 40 is D3, and the diameter of the inner circumference of the magnet 40 is D4. Assuming that the inner diameter of the yoke 30 is constant in this case, if the radial width (D1−D2) of the tooth portion 66 is made too large, the space for winding the coil 70 is decreased by just that much, thereby causing the torque able to be generated to be decreased. On the other hand, if the radial width (D1−D2) is made too small, magnetic saturation sometimes occur in the tooth portion 66, and there is the possibility that torque ripple may be increased due to the occurrence of a bias in the magnetic flux distribution. In addition, if the radial width (D1−D2) of the tooth portion 66 is made too large, the thickness of the magnet 40 becomes smaller as just that much, and hence a sufficient thickness (D3−D4) of the magnet 40 cannot be secured. Accordingly, in the disk drive device 100 according to the embodiment, the relationship represented by the following equation (1) is satisfied:

$$(D3-D4)/3 < D1-D2 < D3-D4 \quad (1)$$

Thereby, an increase in the torque ripple can be suppressed while a sufficient generation amount of torque is being secured.

Figure 8:
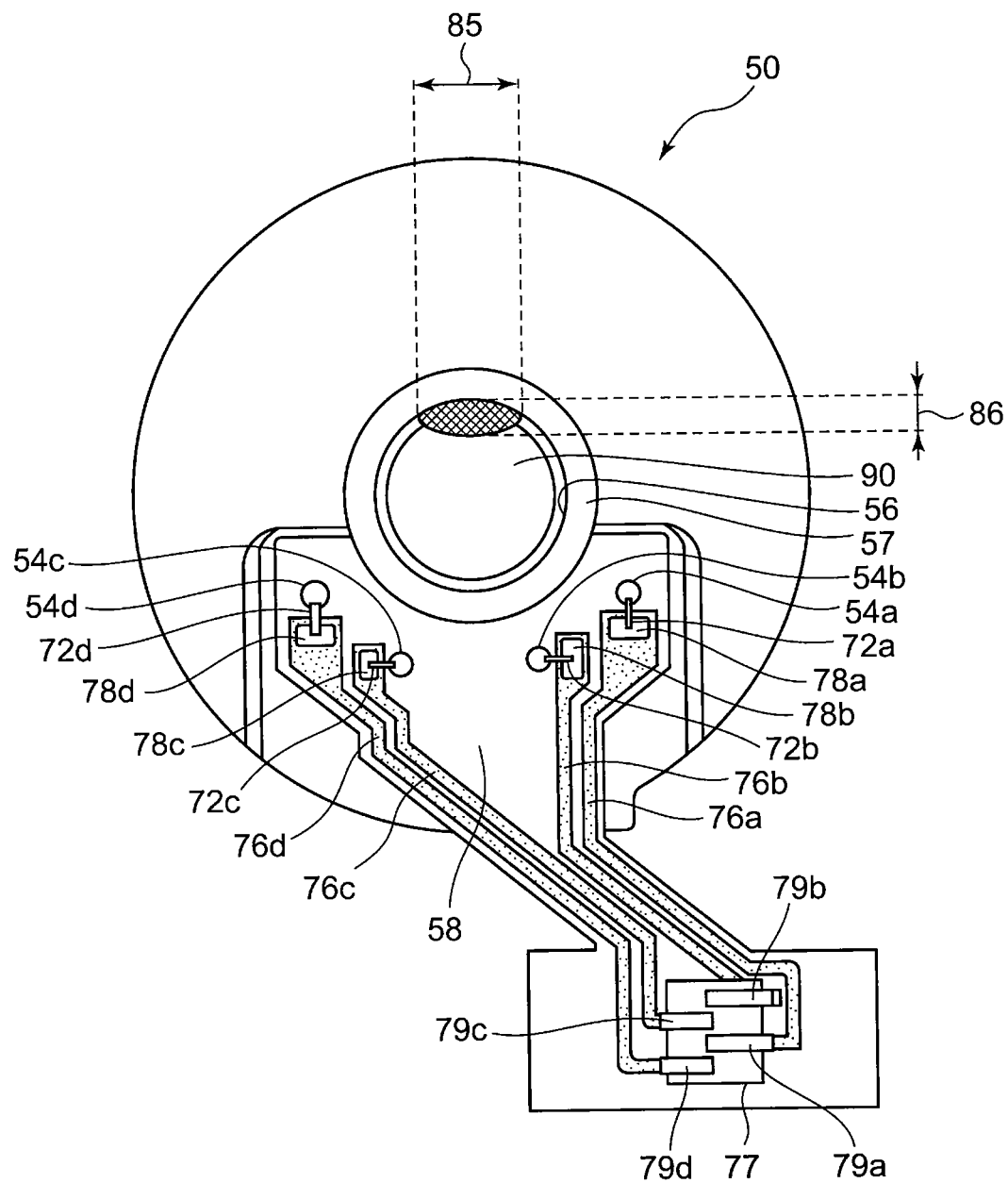
FIG. 8 is a view illustrating the back surface of part of a base according to the embodiment.

FIG. 8 illustrates the back surface of part of the base 50 according to the embodiment. In the present view, the wire 72 pulled out to the back surface of the base 50 through the pull-out hole 54 and the wiring thereof are mainly illustrated.

A three-phase coil is generally formed of two pull-out wires for each phase, i.e., at least six pull-out wires, in total. If six pull-out wires are pulled out from one pull-out hole, the possibility that the pull-out wires may be brought into contact with each other or brought into contact with the base 50 is increased. If the pull-out wires are brought into contact with each other or brought in contact with the base 50, there arises the fear that desired powering cannot be performed, thereby causing the rotation to be unstable. Accordingly, in the disk drive device 100 according to the embodiment, a plurality of pull-out holes 54 are provided in the base 50 such that the pull-out wires 72 are pulled out from the plurality of pull-out holes 54. Thereby, the possibility that the pull-out wires 72 may be brought into contact with each other or brought into contact with the base 50 can be reduced.

The pull-out hole 54 includes first holes 54a, 54b, and 54c each for pulling out one pull-out wire 72, and a second hole 54d for pulling out a plurality of pull-out wires 72 in a bundle. In the base 50 according to the embodiment, the first holes 54a, 54b, and 54c and the second hole 54d are provided at positions within a range axially overlapping the coil 70, i.e., provided below the coil 70. The first holes 54a, 54b, and 54c are respectively provided at the positions, each of which is away from the rotational center by approximately the same distance as those of others. The second hole 54 is also provided at the position away from the rotational center by approximately the same distance as that of the first hole 54a. Thereby, the wire 72 can be easily pulled out.

Specifically, assuming that the three-phase coil 70 is formed into a Y-connection, one pull-out wire 72a, which is one end of the wire of which the first-phase coil 70 is formed, is pulled out from the first hole 54a and fixed to a wiring 76a by solder 78a. One pull-out wire 72b, which is one end of the wire of which the second-phase coil 70 is formed, is pulled out from the first hole 54b and fixed to a wiring 76b by solder 78b. One pull-out wire 72c, which is one end of the wire of which the third-phase coil 70 is formed, is pulled out from the first hole 54c and fixed to a wiring 76c by solder 78c. On the other hand, with the other ends of the wires of which the first through third-phase coils 70 are formed being the midpoint of the Y-connection, the pull-out wire 72d in which the three wires are bundled is pulled out from the second hole 54d and fixed to a wiring 76d by solder 78d. The second hole 54d may have an opening area larger than that of the first hole 54a. Thereby, while the cost is being suppressed by making three wires compatible, the pull-out holes 54 in accordance with the wires can be provided.

Subsequently, there are sometimes cases where, when a twisted wire formed by twisting two or more wires is soldered, melted solder is moved along a twisted portion of the wires, then sucked into the pull-out hole 54 due to capillarity. There arises the fear that, if the solder sucked into the pull-out hole 54 is brought into contact with the pull-out hole 54, the pull-out wire 72 for the coil 70 may be short-circuited to the base 50. Accordingly, the disk drive device 100 according to the embodiment is configured such that the smallest gap between a soldering position where the pull-out wire 72d is soldered to the wiring 76d and the position of the second hole 54d is 0.3 mm or longer. In other words, the smallest gap between the outer circumference of the solder 78d and that of the second hole 54d is made to be 0.3 mm or longer. Thereby, the possibility that the solder 78d may enter the second hole 54d can be reduced.

As illustrated in FIG. 2, the base 50 has, on the back surface thereof, the concave portion 58 concaved with respect to the opening 57. The wiring 76 is fixed to the concave portion 58 and soldered. A connector 77 is arranged on the wiring 76. The connector 77 has four terminals 79a, 79b, 79c, and 79d, which are respectively connected to the wirings 76a, 76b, 76c, and 76d.

Conventionally, the connector 77 is manually soldered to the wiring 76 after the wiring 76 has been pasted to the back surface of the base 50, in the assembling process of the wiring 76 and the connector 77. Accordingly, the connector 77 is sometimes deformed due to the heat of soldering iron. In a method of producing the disk drive device 100 according to the embodiment, it is made that the wiring 76 is fixed to the concave portion 58 after the connector 77 has been soldered onto the wiring 76 by reflow. Thereby, the possibility that the connector 77 may be deformed is reduced, and the work can be easily mechanized. Accordingly, the efficiency of the work for installing into the base 50 can be increased.

Figure 9:
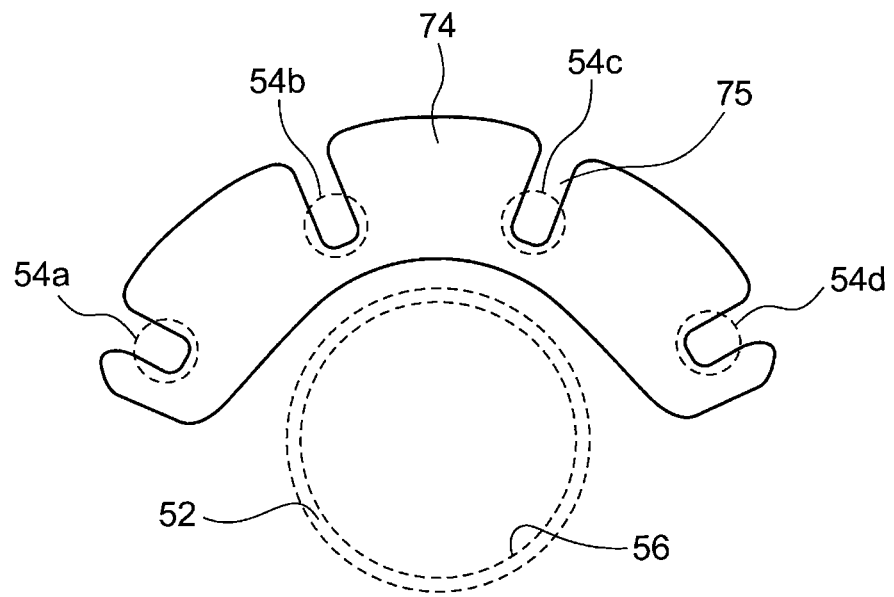
FIG. 9 is a view illustrating an insulation sheet according to the embodiment.

FIG. 9 illustrates the insulation sheet 74 according to the embodiment. The insulation sheet 74 is formed into an approximately arc shape and attached to the surface of the base 50, the surface facing the coil, and in which cutting portions 75 are respectively provided in accordance with the plurality of pull-out holes 54. Specifically, the cutting portions 75 are formed in accordance with the positions and the number of the pull-out holes 54, each of the cutting portions 75 having a shape that is cut from the outer circumferential side of the arc shape toward the radial inside thereof. Part of the circumference of the pull-out hole 54 is covered with the insulation sheet 74. That is, the circumference of the pull-out hole 54 is partially covered with the arc portion of the U-shaped cutting portion 75. The radial width of the insulation sheet 74 is set in accordance with that of the coil 70 and the circumferential length of the insulation sheet 74 is set in accordance with the interval between the plurality of pull-out holes 54. Processing of the pull-out hole 54 and the circumference thereof is complicated in comparison with that of a planar portion, and accordingly the possibility of being brought into contact with the coil 70 is high due to a processing error, etc. By pasting the insulation sheet 74 around the pull-out hole 54, cost can be suppressed in comparison with the case where the pull-out hole 54 is formed into a circular shape, while the insulation is being efficiently achieved.

Referring back to FIG. 8, the conductive resin material 84 is applied to an area ranging from the base 50 to the bearing unit in order to efficiently remove the static electricity charged in the recording disk 200, thereby allowing the conduction between them to be secured. The conductive resin material 84 is circumferentially applied to the joint portion between the bearing hole 56 of the base 50 and the lower end portion of the bearing unit. That is, because the sleeve 80 of the bearing unit is fixed to the bearing hole 56 of the base 50 by non-conductive adhesive, the conduction between the bearing unit and the base 50 can be secured by the conductive resin material 84, thereby allowing the static electricity generated in the bearing unit due to the rotation to be released into the base 50. An example of a conductive resin material according to a comparative example includes one in which an epoxy resin is mixed into silver paste that is a main component. The conductive resin material is cured by the action of a curing agent. That is, the resin material is a two-component conductive resin material. When the two-component conductive resin material is used, migration occurs in the epoxy resin in the course of the curing of the epoxy resin, thereby possibly causing the conductive resin material to be attached around the application area. If an epoxy resin migrates to an area in the black coating of the base and is attached thereto, the luster of the area is only changed and accordingly a difference with other areas is generated, thereby causing the problem that the appearance is deteriorated.

In order to deal with the problem, in the present embodiment, the conduction between the base 50 and the bearing unit is achieved mainly by a conductive resin material excluding an epoxy resin. For example, a conductive resin material excluding an epoxy resin as a resin main component, in which a metallic material having conductivity is included as a metal main component, is used. Specifically, a conductive resin material excluding an epoxy resin is included in a ratio of 80% or more as a resin component. Thereby, the problem that the appearance of the coated area of the base 50 may be deteriorated due to the migration of an epoxy resin is reduced. As a metallic material having conductivity, various materials, such as silver paste, can be used. For example, metallic materials including nickel paste are preferred in terms of less deterioration with age of conductivity and being inexpensive. As a conductive resin material excluding an epoxy resin as a resin main component, various materials can be used. For example, the material with a product number of 3317 made by ThreeBond Co., Ltd. is a conductive resin material including nickel paste as a main component and excluding an epoxy resin, and is a one-component type resin material, and hence the material does not need extra labor of mixing two components, etc., thereby being advantageous in mechanizing the application work.

For example, when the base 50 is made of aluminum and the bearing unit is formed of a metallic material, such as brass, there is a great difference between the coefficients of linear expansion and heat capacities of the metallic material and the conductive resin material. Accordingly, a great difference occurs between the thermal expansions and contractions thereof in a so-called heat shock test, thereby causing great stress to be laid on the applied conductive resin material. As a result, there arises the fear that the applied conductive resin material may be peeled off and the conduction between the base 50 and the bearing unit be deteriorated. In order to deal with the problem, it may be made that the conductive resin material 84 is circumferentially applied to the bearing hole 56 and the lower end portion of the bearing unit, as illustrated in FIG. 8. Thereby, the conductive resin material can be efficiently applied near to the joint portion between the base 50 and the bearing unit, thereby allowing peeing off of the conductive resin material to be hardly generated. As a result, the possibility that the conduction between the base 50 and the bearing unit may be deteriorated can be reduced even in a heat shock test.

As a result of experiments, when the circumferential length 85 and radial width 86 of the area to which the conductive resin material 84 had been applied were approximately equal to each other, the conduction in each of two out of twenty disk drive devices was deteriorated in a heat shock test. On the other hand, when the circumferential length 85 of the area to which the conductive resin material 84 had been applied was one and half times longer than the radial width 86 thereof, the number of the disk drive devices in which the conduction was deteriorated was reduced to one out of twenty devices. Further, when the circumferential length 85 was two times longer than the radial width 86, the number of the disk drive devices in which the conduction was deteriorated was reduced to zero out of twenty devices. Accordingly, by making the circumferential length of the area to which the conductive resin material had been applied to be one and half times or more longer than the radial width thereof, the possibility that the conduction between the base 50 and the bearing unit may be deteriorated in a heat shock test can be reduced.

As illustrated in FIG. 2, the area to which the conductive resin material 84 has been applied is covered with the sealing member 32. The sealing member 32 seals the opening of the bearing hole 56 and covers the area to which the conductive resin material 84 has been applied and the joint portion between the bearing hole 56 and the bearing unit. Thereby, the conductive resin material 84 and the joint portion between the bearing hole 56 and the bearing unit can be protected. Further, evaporation of the lubricant can be suppressed when the sleeve 80 is formed of a porous sintered metal. The gas generated from the conductive resin material 84 can be confined. The sealing member 32 may have a display area where production information of a disk drive device is displayed. Thereby, production information thereof can be held by the sealing member 32.

Figure 10:
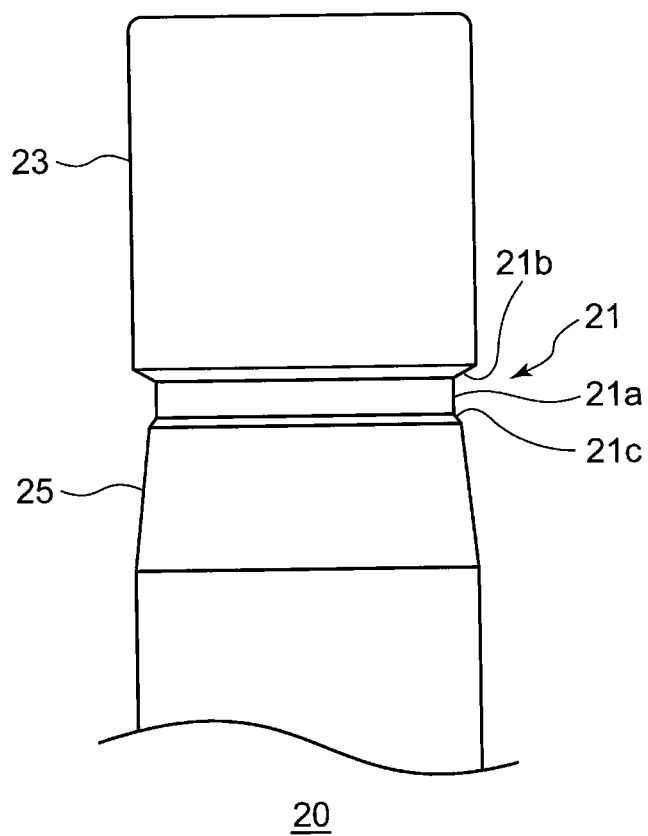
FIG. 10 is a sectional view of part of a shaft according to the embodiment.
Figure 11:
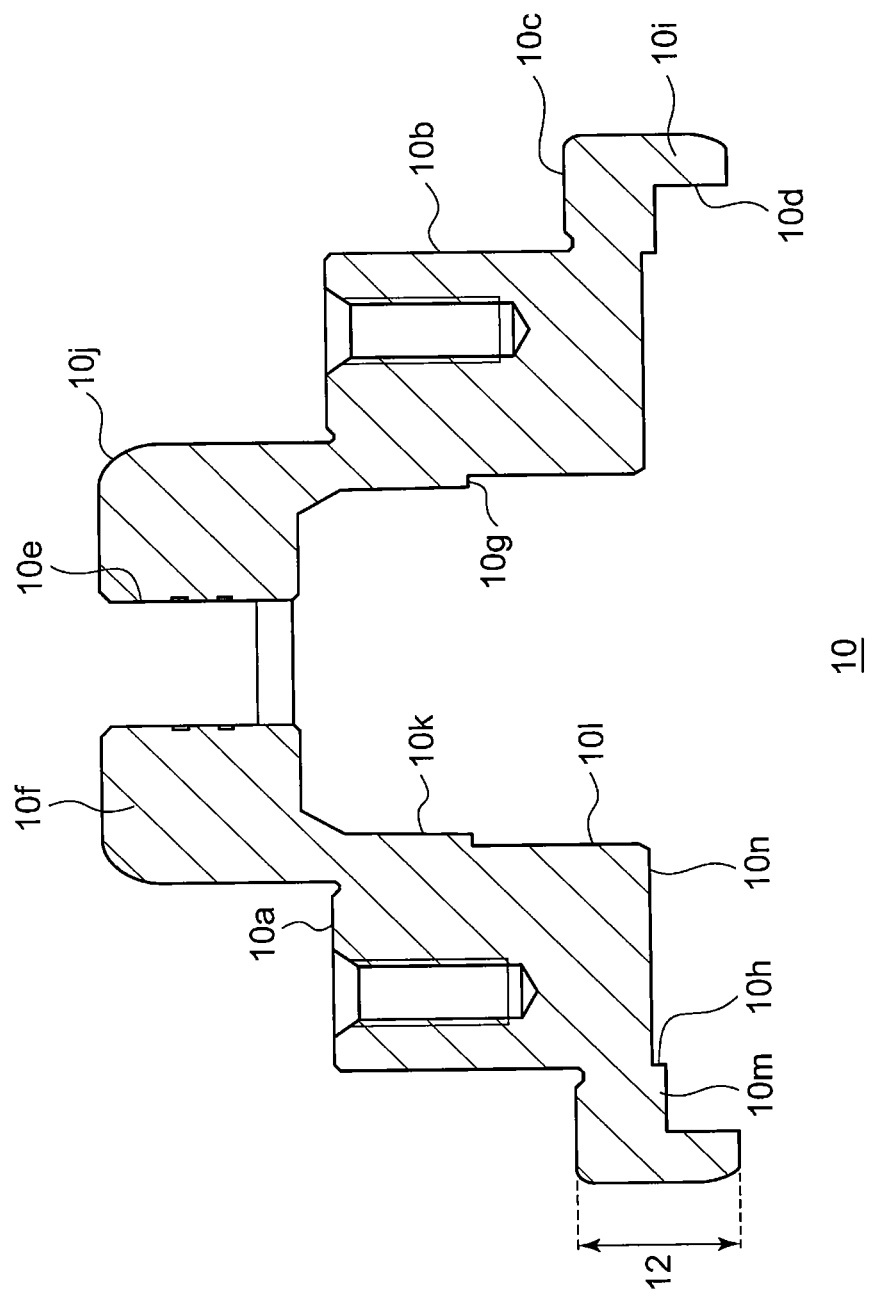
FIG. 11 is a sectional view of a hub according to the embodiment.

FIG. 10 illustrates the sectional view of part of the shaft 20 according to the embodiment. The portion above a capillary seal formed portion 25 is illustrated. The shaft 20 includes a hub fixed portion 23, a shaft concave portion 21, and the capillary seal formed portion 25.

As illustrated in FIG. 2, the hub fixed portion 23 is provided at the upper end of the shaft 20 and fixed to the shaft hole 10*e* of the hub 10. The shaft concave portion 21 is provided adjacently below the hub fixed portion 23, and the capillary seal formed portion 25 is provided adjacently below the shaft concave portion 21. The capillary seal formed portion 25 is formed such that the diameter thereof is reduced toward the axial upper side.

The shaft concave portion 21 is formed to be more concaved than the hub fixed portion 23 and the capillary seal formed portion 25. The shaft concave portion 21 includes a cylindrical bottom 21*a* having a predetermined width, a first step portion 21*b* provided on the bottom 21*a*, and a second step portion 21*c* provided below the bottom 21*a*.

An oil repellent agent is applied to the shaft concave portion 21 located above the capillary seal formed portion 25. When the oil repellent agent is applied to an area above the capillary seal formed portion 25, the oil repellent agent is sometimes applied to the capillary seal formed portion 25 due to production error. If the oil repellent agent is adhered thereto, the capillary force of the capillary seal formed portion 25 is decreased.

Because the shaft 20 according to the embodiment has the second step portion 21*c* between the bottom 21*a*, which is an area to which the oil repellent agent is applied, and the capillary seal formed portion 25, it can be suppressed that the oil repellent agent may drip off when the oil repellent agent is applied to the bottom 21*a*. Further, by providing step portions on and below the bottom 21*a*, the area to which the oil repellent agent is applied can be made clear. Thereby, the application work can be performed easily and it can be prevented that a non-application area may be applied. Alternatively, the oil repellent agent may be applied to the first step portion 21*b* and the second step portion 21*c* in addition to the bottom 21*a*.

Figure 12:
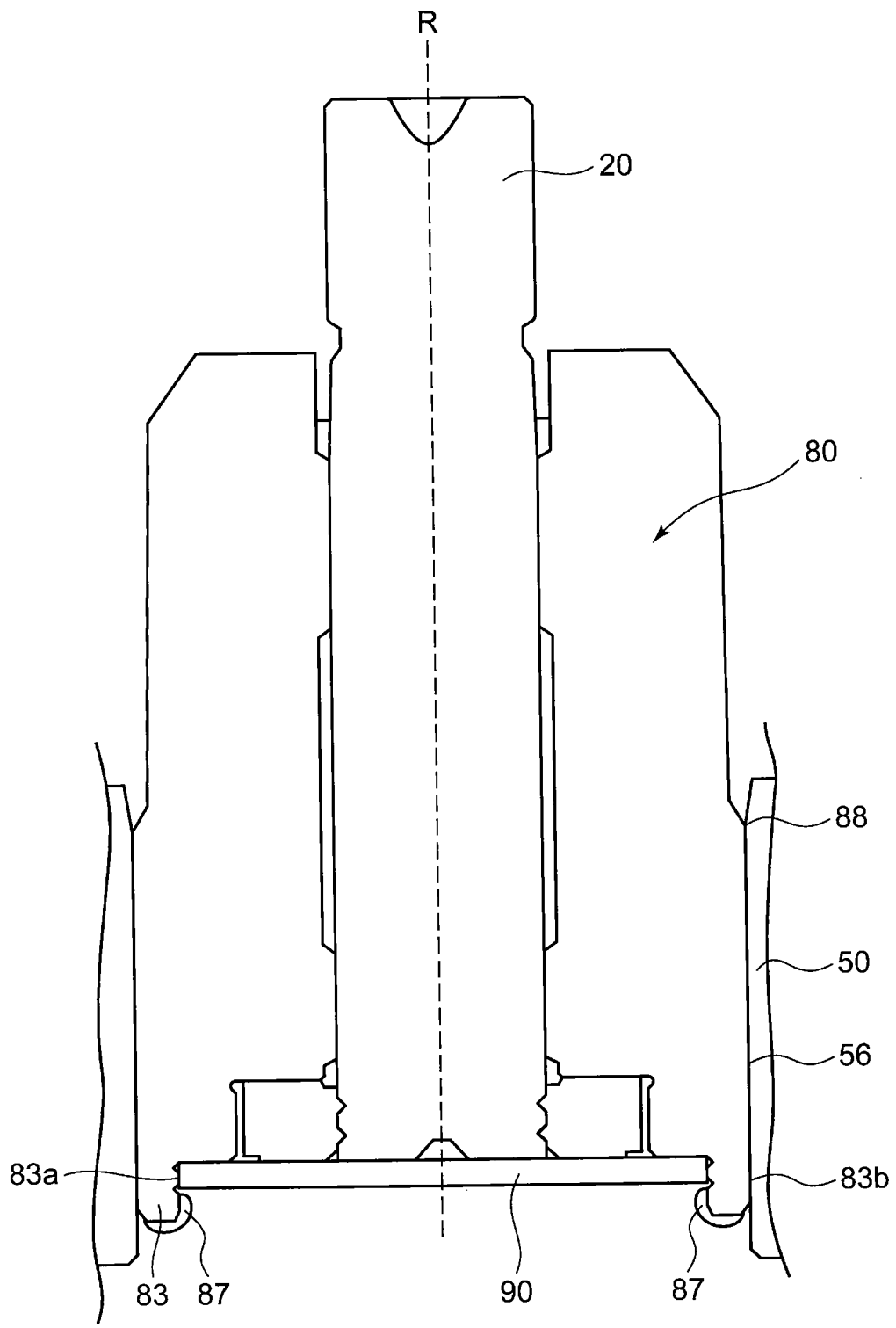
FIG. 12 is a view illustrating a sleeve that is centered and enlarged in the disk drive device according to the embodiment.

FIG. 12 illustrates the sectional view of the hub 10 according to the embodiment. The configurations described in FIG. 2 will be omitted. A circumferential corner portion 10*j* around the central portion 10*f* of the hub 10 is formed into a rounded shape. The corner radius R of the circumferential corner portion 10*j* is set to be 1.0 mm or more and 6.3 mm or less. Thereby, the work for installing the clamper 206 can be easily performed, thereby allowing the clamper 206 to be efficiently installed in the horizontal direction. In addition, the surface roughness Ry of the circumferential corner portion 10*j* may be set to be smaller than or equal to 1.6 μm. Thereby, the work for installing the clamper 206 can be easily performed.

The hub 10 has, in the inside thereof, a surrounding portion by which the upper portion of the sleeve 80 is circumferentially surrounded. The surrounding portion has a first surrounding portion 10*k* located upward and a second surrounding portion 10*l* located downward. The first surrounding portion 10*k* is axially adjacent to the second surrounding portion 10*l* through a first step portion 10*g* and is formed such that the diameter of the inner circumference thereof is smaller than that of the second surrounding portion 10*l*. That is, the first surrounding portion 10*k* is formed such that the gap between the first surrounding portion 10*k* and the outer circumferential surface of the sleeve 80 is smaller than that between the second surrounding portion 10*l* and the outer circumferential surface of the sleeve 80.

The first surrounding portion 10*k* and the first step portion 10*g* protrude toward the rotational center. On the other hand, the space formed by the second surrounding portion 10*l* and the outer circumferential surface of the sleeve 80 is formed to be larger than that formed by the first surrounding portion 10*k* and the outer circumferential surface of the sleeve 80. By making the gap with the sleeve 80 to be small as stated above, the gas generated from the lubricant can be saturated in the space above the first surrounding portion 10*k*, thereby, allowing the evaporation of the lubricant to be suppressed.

The hub 10 has a second step portion 10*h* between the surface 10*n* facing the stator core 60 and the coil 70, and a yoke fixed surface 10*m* to which the upper end surface of the yoke 30 is fixed. The surface 10*n* facing the coil 70 is more concaved axially upward than the yoke fixed surface 10*m*. The space formed by the surface 10*n* facing the coil 70 and the upper surface of the base 50 is formed such that the axial gap thereof is larger than that of the space formed by the yoke fixed surface 10*m* and the upper surface of the base 50. There is a technique in which, when torque becomes small due to the miniaturization of the stator core 60, the torque is compensated by forming the coil 70 with more wires, in accordance with the decreased torque, being wound around it; however, when the coil 70 is made large, the possibility that the coil 70 and the hub 10 may be brought into contact with each other is increased. By securing a larger space by the surface 10*n* facing the coil 70 and the second step portion 10*h*, the possibility that the coil 70 and the hub 10 may be brought into contact with each other can be reduced.

The annular extending portion 10*c* of the hub 10 includes a hanging portion 10*i* that hangs from the mounting surface on which the recording disk 200 is to be mounted. Thereby, the outer circumferential surface of the yoke 30 can be firmly attached to the inner circumferential surface 10*d* of the hanging portion 10*i*. As illustrated in FIG. 2, the width-increased portion 51 is formed in the base 50 axially facing the hanging portion 10*i*, the width-increased portion 51 protruding into the space below the hanging portion 10i. A staircase with two steps is formed from the surface of the base 50, the surface facing the coil 70, and the first step is the width-increased portion 51. Thereby, the stiffness of the base 50 can be increased in comparison with the case where the width-increased portion 51 is not provided.

The lower end surface of the hanging portion 10i is located axially above the axial center of the yoke 30 and the magnet 40. The width-increased portion 51 is formed such that the axial dimension thereof is larger than the axial dimension 12 of the hanging portion 10i. Thereby, the width-increased portion 51 can be formed to be large in size and accordingly the stiffness of the base 50 can be increased, while the surface to which the outer circumferential surface of the yoke 30 is firmly attached is being secured.

Subsequently, after the stator core 60 is press-fitted into the outer circumference of the annular protruding portion 52 of the base 50 in the assembling process of the disk drive device 100, the sleeve 80 (bearing unit) is inserted into the inner circumference of the annular protruding portion 52 (bearing hole 56). The annular protruding portion 52 is sometimes bent toward the rotational center when the stator core 60 has been press-fitted, and hence the sleeve 80 sometimes cannot be inserted smoothly. The outer diameter of the annular protruding portion 52 is smaller than the inner diameter of the stator core 60. The difference between the outer diameter of the annular protruding portion 52 and the inner diameter of the stator core 60, before assembled, is called a press-fitting margin. When the sleeve 80 is forced to be inserted into the annular protruding portion 52, there is the possibility that the sleeve 80 may be installed in a tilted state.

A bending amount of the annular protruding portion 52 toward the rotational center was measured when the stator core 60 was press-fitted into the outer circumference of the annular protruding portion 52 of the base 50. As a result, when the press-fitting margin is within a range of 50 μm or less, a bending amount of the annular protruding portion 52 was changed in accordance with the press-fitting margin and was approximately half the press-fitting margin. Accordingly, the annular protruding portion 52 is provided such that the inner diameter of the bearing hole 56 (annular protruding portion 52), before assembled, is larger than the outer diameter of the sleeve 80 by half the press-fitting margin or more. Thereby, the sleeve 80 can be smoothly inserted into the bearing hole 56 and the possibility that the sleeve 80 may be installed in a tilted state can be reduced.

FIG. 12 is a view illustrating the sleeve 80 that is center and enlarged in the disk drive device 100 according to the embodiment. The sleeve 80 according to the embodiment is molded into a cylindrical shape with a porous material and then formed by being sintered. The diameter of a pore is within a range of 10 μm to several μm.

The base 50 forms, in the inside of the disk drive device, a housing space by joining the top cover thereto. The housing space enclosed by the base 50 and the top cover is filled with clean air. The clean air may be one from which dust and dirt have been removed via a filter. The clean air may contain more helium, a low molecular gas, than the atmosphere, and accordingly may have a helium ratio higher than that of the atmosphere. By filling the housing space with the clean air containing a low molecular gas, the flotation of the recording/reproducing head 8a can be suppressed and the miniaturization and higher density of the disk drive device 100 can be achieved.

The base 50 has the bearing hole 56 communicating ambient air and the housing space. The sleeve 80 is fitted into the bearing hole 56, thereby the communication between them being blocked. However, helium, a low molecular gas, is likely to pass through the pores in the sleeve 80, and hence there is the possibility that the helium may leak out from an externally-exposed portion of the sleeve 80 exposed to ambient air. Accordingly, at least part of the pores on the surface of the externally-exposed portion that is in contact with ambient air are filled in. Thereby, it can be suppressed that the clean air in the housing space may leak out through the sleeve 80. Further, the possibility that the recording/reproducing head 8a may be excessively floated due to the leak of the clean air, a low molecular gas, can be reduced.

The externally-exposed portion includes the circumferential lower end portion 83 exposed to ambient air from the gap of the bearing hole 56. The circumferential lower end portion 83 extends radially along the circumferential surface of the bearing hole 56 and protrudes outward. The inner circumferential surface 83a of the circumferential lower end portion 83 is fixed to the outer circumferential surface of the plate 90 and the outer circumferential surface 83b thereof is fixed to the bearing hole 56. By substantially filling in at least part of the surface of the circumferential lower end portion 83 in contact with ambient air, the leak of the clean air can be suppressed. The pores on at least 80% or more of the surface of the circumferential lower end portion 83 in contact with ambient air may be filled in.

The circumferential lower end portion 83 may be compressed to fill in the opening to ambient air of the pores in the circumferential lower end portion 83. The pores can be processed and accordingly the opening thereof can be filled in by compressing the circumferential lower end portion 83. For example, the circumferential lower end portion can be compressed by pressing it with a pressing member. The pressing member may be a roller having a contact surface in accordance with the shape of the circumferential lower end portion 83. The radial width of the circumferential lower end portion 83 may be compressed by an amount of several tens μm or more. In this process, the work can be easily performed and the production cost can be suppressed. The pores in an area of the circumferential lower end portion 83 to which the plate 90 is fixed may not be filled in.

In addition, at least part of the surface of the circumferential lower end portion 83 in contact with ambient air may be subjected to an oxidation treatment. For example, the surface of the circumferential lower end portion 83 is oxidized by soaking the circumferential lower end portion 83 in an oxidizing liquid, so that the pores are filled in. Thereby, the pores can be surely processed by a chemical action.

Alternatively, a resin material 87 may be adhered to at least part of the surface of the circumferential lower end portion 83 in contact with ambient air. For example, the resin material 87 may be cured after the liquid resin material 87 has been circumferentially applied to the circumferential lower end portion 83. Thereby, the pores on the surface of the circumferential lower end portion 83 can be filled in. Further, the pores can be filled in more surely by subjecting the circumferential lower end portion 83 to a combination of a pressing treatment, oxidation treatment, and resin adhesion treatment. In addition, the resin material 87 may be the conductive resin material 84 illustrated in FIG. 2.

On the other hand, the leak of the clean air may be suppressed by filling in the surface of the sleeve 80 open to the clean air. For example, a resin material may be adhered to the outer circumferential surface of the sleeve 80 located above the joint portion 88 between the sleeve 80 and the bearing hole 56. Thereby, it can be suppressed that the clean air in the housing space may leak out. Alternatively, the leak of the clean air can be suppressed by pasting the sealing member 32 illustrated in FIG. 2.

Production processes of the disk drive device 100 having such the sleeve 80 will be described. The sleeve 80 is first molded with a porous material. Subsequently, dynamic pressure grooves are formed on the inner circumference of the sleeve 80. Subsequently, the sleeve 80 is sintered by heating. Pores are formed in the sleeve 80 by the sintering. At least part of the pores on the surface of the externally-exposed portion of the sleeve 80, the surface being in contact with ambient air, is then filled in. Subsequently, residual substances in the sleeve 80 are removed. The sleeve 80 in which the pores have been filled in can be produced by the aforementioned production processes. Further, the impurities adhered to the sleeve 80 can be removed by the processes for filling in the pores, thereby reducing the possibility that the impurities may enter the housing space. After the process for removing residual substances, the sleeve 80 is fixed to the bearing hole 56 of the base 50.

It is preferable to perform the processes for filling in the pores in the order of a pressing process, oxidation process, and resin adhesion process. It is because that the possibility of an oxidation surface or a resin being broken is reduced by the pressing process and that the possibility of the resin being oxidized is reduced by the oxidation process.

It is preferable to perform the processes for filling in the pores before a process by which the sleeve 80 is installed in the disk drive device 100. If the processes are performed after the process by which the sleeve 80 is installed in the disk drive device 100, there is the possibility that the resin material or the oxidizing liquid may be adhered to the base 50, etc., thereby, possibly resulting in decreased work efficiency. Accordingly, the work efficiency can be improved by filling in the pores before the sleeve 80 is installed in the disk drive device 100.

In the process for removing residual substances, the residual substances can be removed by placing the sleeve 80 in a high-temperature tank to be exposed to the ambient atmosphere at a predetermined temperature or higher. With the predetermined temperature at 100 degrees or higher, a sufficient effect of removing the residual substances can be exhibited. A rotating machine provided with the sleeve 80 in which the pores have been filled in by the aforementioned processes can be produced.

Herein, referring back to FIG. 2, the sleeve 80 is formed of a porous material and has a first surface on which at least part of the pores in an area facing the bearing hole 56, of the outer circumferential surface of the sleeve 80, have been filled in. Adhesive is interposed between the first surface of the sleeve 80 and the bearing hole 56. Thereby, it can be achieved that the adhesive is suppressed from being absorbed into the first surface of the sleeve 80, the pores on which have been filled in. The sleeve 80 houses the shaft 20 on the inner circumferential side of the sleeve 80 and has a second surface on which at least part of the pores in an area facing the shaft 20, of the inner circumferential surface of the sleeve 80, have been filled in. The radial dynamic pressure grooves 82 are formed on the second surface of the sleeve 80 such that lubricant oil may permeate the radial dynamic pressure grooves 82 and dynamic pressure may be decreased. The sleeve 80 arranges the shaft 20 and the flange 22 joined to the shaft 20 on the inner circumferential side of the sleeve 80 and has a third surface on which at least part of the pores in an area axially facing the flange 22, of the inner surface of the sleeve 80, have been filled in. Thereby, it can be suppressed that the lubricant oil may permeate the third surface of the sleeve 80 and dynamic pressure may be decreased. The sleeve 80 has a fourth surface on which at least part of the pores in an area facing the shaft 20 have been filled in. The capillary seal portion 98 is formed in the gap between the fourth surface and the outer circumferential surface of the shaft 20, the gap gradually expanding toward the axial upper side. Thereby, it can be suppressed that the lubricant oil may permeate the fourth surface of the sleeve 80 and a sealing function may be decreased.

The disk drive device 100 according to the embodiment, in which the recording disks 200 each having a thickness of 1.27 mm are to be mounted, has been described; however, the disk drive device 100 is not limited thereto. For example, the thickness of a recording disk may be made to be 1.4 mm or more. Such a recording disk is preferable because vibration in the recording disk can be suppressed by a change in the resonance frequency thereof. Alternatively, the thickness thereof may be made to be 1.7 mm or more. Thereby, vibration in the recording disk can be further suppressed.

The disk drive device 100 according to the embodiment, in which the number of the magnet poles of the magnet 40 is twelve and the number of the salient poles is nine, has been described; however, the disk drive device 100 is not limited thereto. The number of the magnet poles of the magnet is made to be an even number of ten to sixteen and the number of the salient poles is made to be a multiple number of three of twelve to twenty-four. Thereby, the total number of coil windings can be made large even when the magnet is miniaturized, and an increase in the cogging torque can be suppressed by making the gap between the magnet and the salient pole that much larger, thereby allowing vibration occurring during the drive to be reduced.

An integrated disk drive device in which the base rotatably supports the hub has been described as the disk drive device 100 according to the embodiment; however, the disk drive device 100 is not limited thereto. For example, a motor according to the embodiment, which has been separately produced, may be attached to the chassis in the hard disk drive.

A so-called outer rotor disk drive device in which the magnet is located outside the laminated core has been described as the disk drive device 100 according to the embodiment; however, the disk drive device is not limited thereto. The technical idea according to the embodiment may be applied to the production of, for example, a so-called inner rotor disk drive device in which a magnet is located inside a laminated core.

A disk drive device in which the sleeve is fixed to the base and the shaft is rotated relative to the sleeve has been described as the disk drive device 100 according to the embodiment; however, the disk drive device is not limited thereto. The technical idea according to the embodiment may be applied to, for example, a shaft-fixed type disk drive device in which a shaft is fixed to a base, and a sleeve and a hub are rotated relative to the shaft.

In the embodiment, the disk drive device 100 mainly used in a hard disk drive has been described; however, the motor according to the embodiment may be mounted in an optical disk recording/reproducing device, such as CD (Compact Disc) device and DVD (Digital Versatile Disc) device, etc.

The present invention has been described based on the preferred embodiments, which are only intended to illustrate the principle and applications of the invention, and it is needless to say that a variety of modifications and variations in arrangement may be made to the embodiments within the range not departing from the spirit of the invention specified in appended claims.

I claim:

1. A method of producing a rotating machine having a sleeve the outer circumference of which is fixed to a bearing hole of a base, the method comprising:
    molding the sleeve with a porous material;
    forming dynamic pressure grooves on the inner circumference of the sleeve;
    sintering the sleeve;
    filling in at least part of the pores on the surface of an externally exposed portion of the sleeve, the externally exposed portion being exposed to ambient air when the sleeve has been fixed to the bearing hole; and
    removing residual substances in the sleeve.

2. The method of producing a rotating machine according to claim 1, wherein
    the filling in the pores includes pressing the externally exposed portion with a pressing member.

3. The method of producing a rotating machine according to claim 1, wherein
    the filling in the pores includes subjecting at least part of the surface of the externally exposed portion to an oxidation treatment.

4. The method of producing a rotating machine according to claim 1, wherein
    the filling in the pores includes adhering a resin material to at least part of the surface of the externally exposed portion.

5. The method of producing a rotating machine according to claim 1, wherein
    in the removing residual substances, the sleeve is exposed to the ambient atmosphere at a predetermined temperature or higher.

6. The method of producing a rotating machine according to claim 1 comprising applying a conductive resin material to an area ranging from the externally exposed portion to the base.

7. The method of producing a rotating machine according to claim 1 comprising covering an opening of the bearing hole in which the externally exposed portion is arranged with a sealing member.

8. The method of producing a rotating machine according to claim 1 comprising filling a housing space in the rotating machine formed by at least the base with a gas containing helium.

* * * * *